United States Patent [19]
Colla

[11] Patent Number: 4,577,520
[45] Date of Patent: Mar. 25, 1986

[54] MECHANICAL PROPULSION SYSTEM

[76] Inventor: Joseph Colla, 730 Santa Susana St., Sunnyvale, Calif. 94086

[21] Appl. No.: 749,188

[22] Filed: Jun. 26, 1985

Related U.S. Application Data

[63] Continuation-in-part of Ser. No. 685,333, Dec. 24, 1984, abandoned, which is a continuation-in-part of Ser. No. 426,261, Sep. 29, 1982, abandoned, which is a continuation-in-part of Ser. No. 403,555, Jul. 30, 1982, abandoned.

[51] Int. Cl.[4] .......................................... F16H 33/20
[52] U.S. Cl. ..................................................... 74/84 R
[58] Field of Search ............... 74/84 R, 84 S; 180/7.1; 244/62, 172

[56] References Cited

U.S. PATENT DOCUMENTS

| | | | |
|---|---|---|---|
| 3,266,233 | 8/1966 | Farrall | 74/84 S |
| 3,492,881 | 2/1970 | Auweele | 74/84 S |
| 3,530,617 | 9/1970 | Halvorson et al. | 74/84 S |
| 4,242,918 | 1/1981 | Srogi | 74/84 S |

Primary Examiner—Allan D. Herrmann
Attorney, Agent, or Firm—Paul L. Hickman

[57] ABSTRACT

A mechanical propulsion system characterized by a housing, a number of power racks rigidly disposed within the housing, a load carriage coupled to the power racks for forward or reverse rotary thrust motion with recoil action, and means for driving the load carriage rearwardly during acceleration as the power carriage moves forwardly with the housing. Once the power carriage and a load carriage are in equilibrium, excess thrust is transferred to the housing and power carriage racks.

1 Claim, 3 Drawing Figures

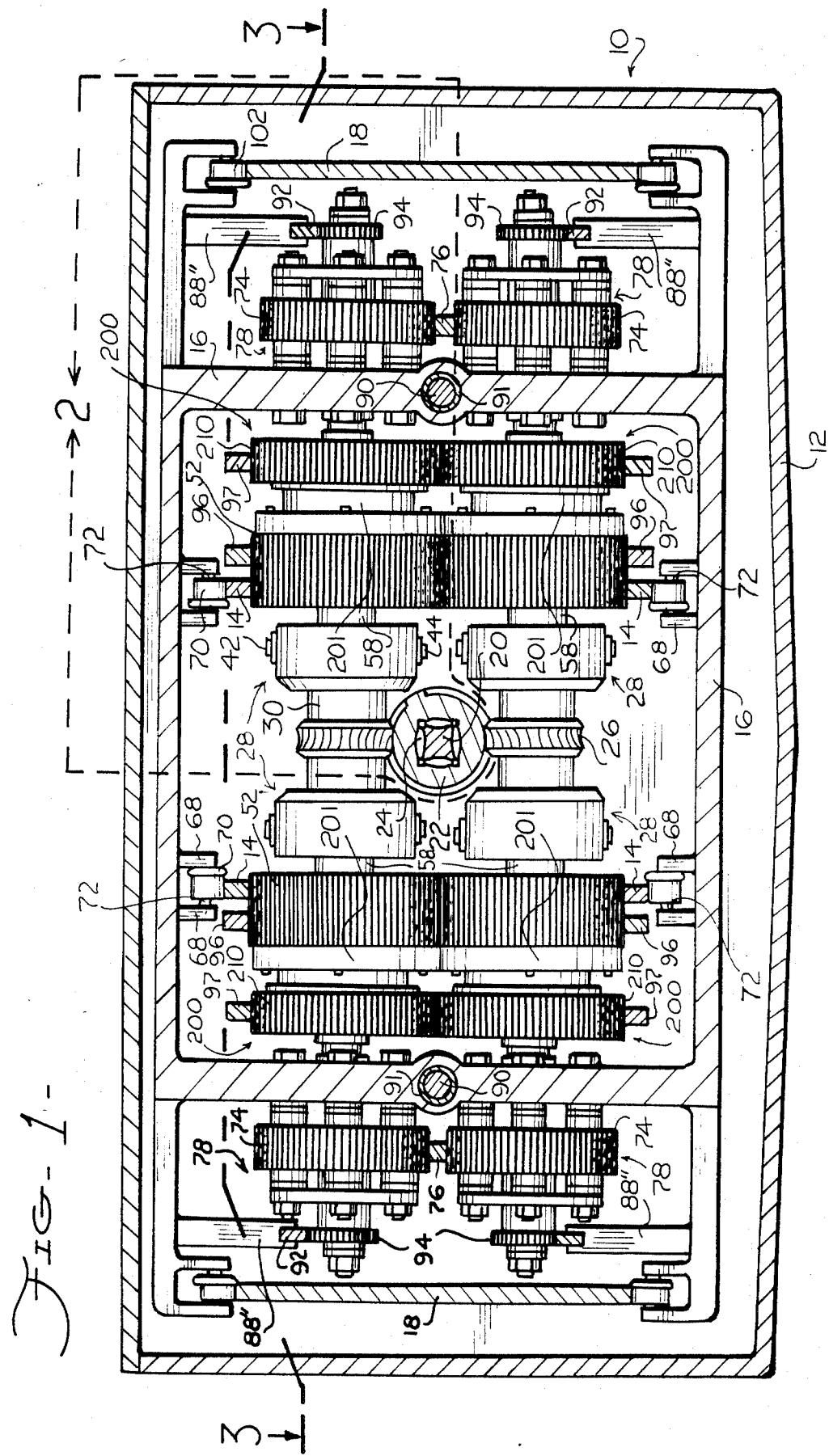
FIG-1-

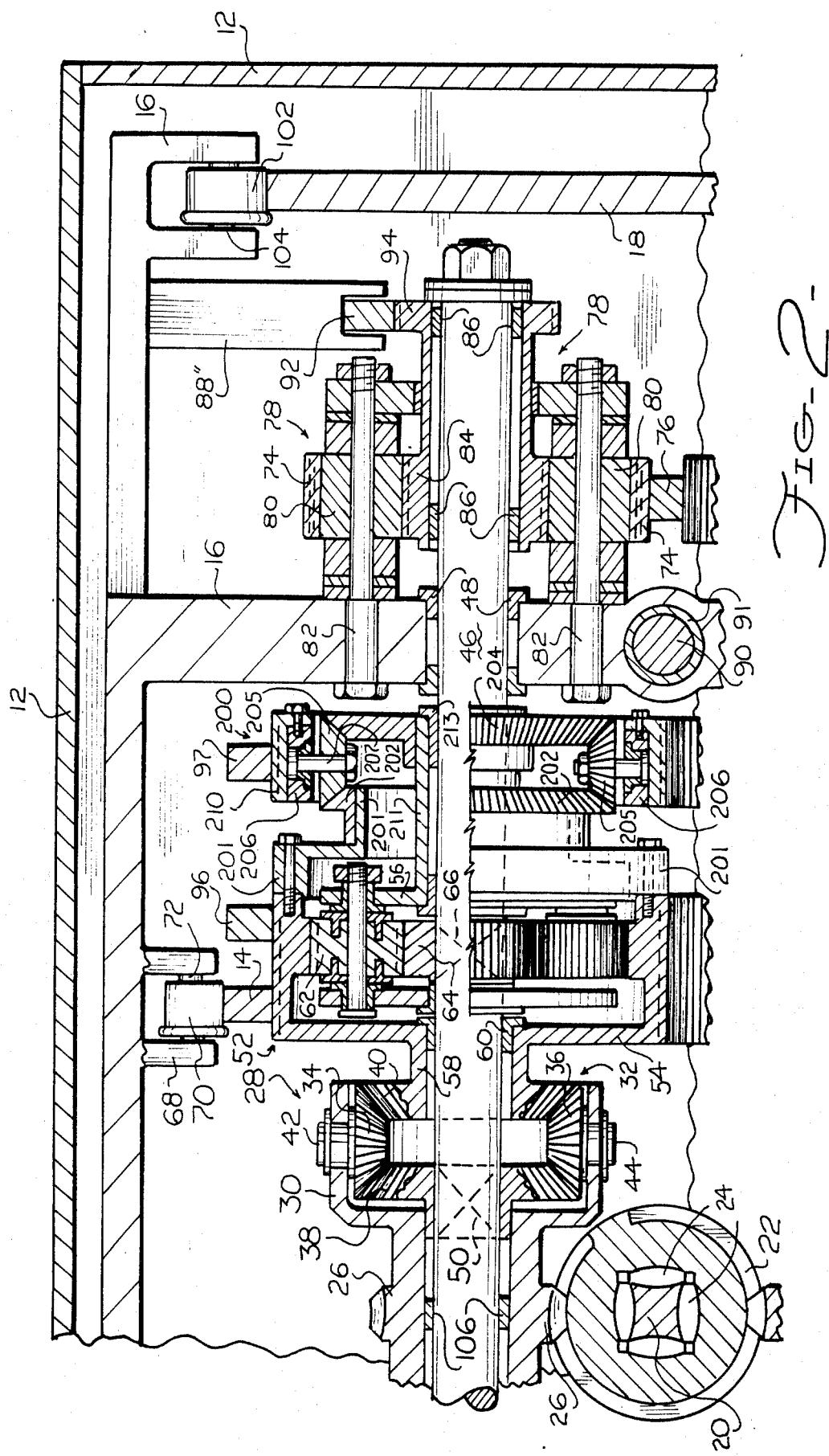

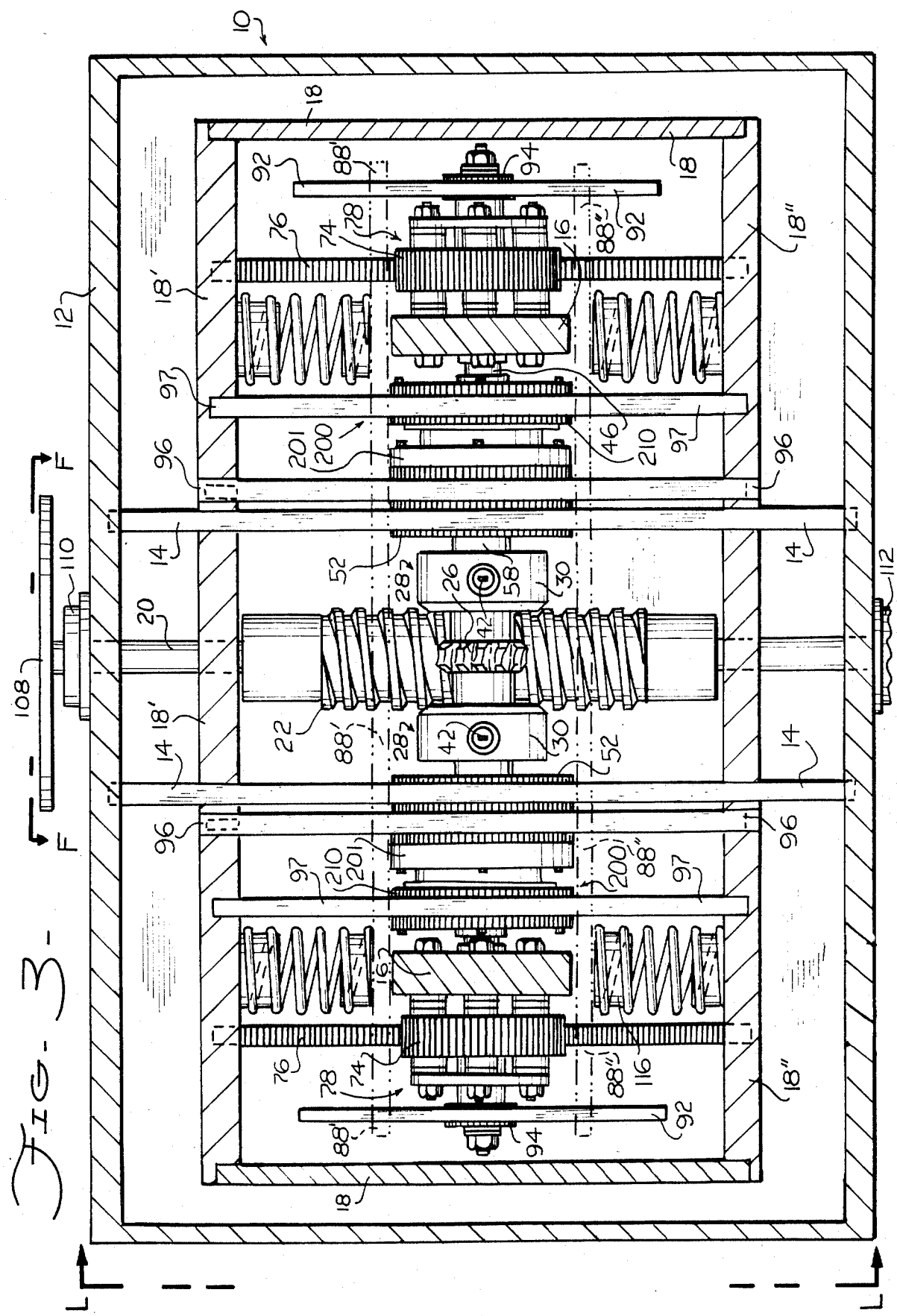

MECHANICAL PROPULSION SYSTEM

CROSS REFERENCE TO RELATED APPLICATIONS

This application is a continuation-in-part of copending Pat. application Ser. No. 06/685,333 filed 12/24/84, now abandoned; which is a continuation-in-part of application Ser. No. 06/426,261 filed 09/29/82, now abandoned; which was a continuation-in-part of Pat. application Ser. No. 06/403,555 filed 7/30/82, now abandoned.

BACKGROUND OF THE INVENTION

1. Field of the Invention

This invention relates generally to mechanical propulsion systems which operate on land or on water.

2. Description of the Prior Art

The prior art discloses several mechanical propulsion systems which utilize a reciprocating or vibratory member to propel a device. For example, in U.S. Pat. No. 3,530,617 of Halvorson et al. a vibration driven vehicle is disclosed including a rotating imbalance which causes a spring to vibrate at its characteristic frequency, imparting a thrust to the vehicle.

In U.S. Pat. No. 4,242,918 of Srogi a mechanical propulsion system is described which imparts a driving force by means of a shuttle accelerated along a linear path. The shuttle is returned to its original position after it reaches the end of its path.

U.S. Pat. No. 3,492,881 of Auweele teaches a prime mover which can move a vehicle in space, on earth, in the water, or in the air. The device includes a pair of displaceable masses, where a first mass is driven in reciprocation by a crank and rod assembly. Kinetic energy from the first mass is stored as potential energy in a spring, where it is converted back into kinetic energy to provide thrust to a second mass.

SUMMARY OF THE INVENTION

It is an object of this invention to provide a mechanical propulsion system which will operate in many different land and water environments.

It is a further object of this invention to provide a mechanical propulsion system which is more efficient than the reciprocating or vibratory propulsion systems of the prior art.

Briefly, the invention includes a housing for supporting and protecting the working parts of the device, a number of housing racks attached between the front and rear walls of the housing and thrust plates, a load carriage coupled to the housing racks for forward or reverse motion with recoil action within the housing, a forward spring plate carried by the front end of the load carriage and capable of independent limited distance linear recoil motion, a rearward spring plate supported from the rear end of the load carriage and capable of independent limited distance linear recoil motion, and a power carriage assembly coupled to the load carriage for independent continuous forward or reverse motion imparted to housing and load with any simultaneous rearward or forward recoiling action due to building up momentum and spring pressure at the beginning of starting or increasing acceleration. The load carriage has a forward power plate positioned between the forward spring plate and the forward end of the housing, and a rearward power plate positioned between the rearward spring plate and the rearward end of the housing. A number of power racks rigidly coupled to the forward power plate and to the rearward power plate.

A drive shaft is rotatably coupled between the forward and rearward ends of the housing, and a worm screw gear is rotatably coupled between the forward and rearward ends of the power carriage to convert rotational energy to linear energy imparted on the power carriage. A pair of transverse worm drive gears are rotatably coupled between the right and left side ends of a transverse load carriage and are engaged with the worm screw gear of the power carriage and rotate around a transverse axis substantially perpendicular to the axis of drive shaft rotation. The transverse worm drive gears are coupled through differentials; and a number of orbital, planetary, and sun gears of the first planetary gear drive system which are coupled to and through a number of rack drive spur gears, vertical and horizontal bevel gears of the bevel lock thrust drive gear system are all coupled to the linear gear power racks of the power carriage to impart a linear force to the housing.

In operation, the rotation of the drive shaft causes a corresponding rotation of the various gears ending with the orbital and rack drive spur gears which are in gear meshed contact with the linear gear power racks of the power carriage and housing. The thrust rotating worm screw gear of the power carriage is in gear meshed contact with worm drive gears of the load carriage, which encounters simultaneously the inertial load resistance generated as a primary reaction causing the power carriage to react and move towards the front of the housing and the load carriage to react by moving rearwardly or recoilingly towards the rear end of the power carriage.

This action builds up momentum and pressure to an extent that, just before an equilibrium condition is reached, the power carriage remains motionless with the housing due to the fact that during the load carriage's rearward recoiling it builds up momentum and pressure in the orbital and rack drive spur gears of the load carriage, which is in gear meshed contact with both linear gear power racks. This prevents the power carriage from moving away towards the rear end of the motionless housing under increasing momentum and pressure that is transmitted to the rear end of the power carriage, which is held motionless with the housing until an equilibrium condition is reached.

During the process of building up momentum and pressure, a number of springs are compressed between the rear end of the recoiling or rearwardly moving thrust transmitting load carriage, storing up potential spring pressure energy until an equilibrium condition is reached and surpassed, converting potential spring pressure energy into kinetic energy. The thrust rotating orbital and rack drive spur gears of the rearward moving load carriage which are in gear meshed contact with the linear gear power racks develop a thrust simultaneously to the housing and power carriage causing a forward movement to be imparted to the housing and power carriage with the rear end of the power carriage moving forward towards the rear end of the recoiling or rearwardly moving thrust transmitting load carriage. This increases the spring pressure to the rear end of the recoiling or rearwardly moving thrust transmitting load carriage, forcing the thrust transmitting load carriage to move forward in the same direction simultaneously with the now forwardly moving housing and power carriage.

During the process of building up momentum and pressure to overcome the inertial load resistance, a primary reaction is generated and transmitted to the power carriage by means of a worm screw gear in gear meshed contact with the worm drive gears of the recoiling or rearwardly moving thrust transmitting load carriage This, in turn, causes the power carriage and housing to move in a forward direction aided by the compressed front springs via the front spring plate of the load carriage. The front spring plate is energized by the recoiling or rearwardly moving thrust transmitting load carriage through a second planetary gear system in gear meshed contact with linear gear power racks of the power carriage to neutralize, cancel out, or balance the inertial load resistance transmitted against the rear end of the motionless or forward moving power carriage.

The action of the forward moving housing and power carriage when power is not increasing reaches an equilibrium of constant velocity with the thrust transmitting load carriage. Adding extra power with an increase to maximum acceleration causes the forward moving thrust transmitting load carriage to recoil rearward with a temporarily reduced forward moving velocity accompanied with an increase of spring pressure transmitted against the rear end of the forward moving power carriage. The increased spring back pressure is thus neutralized, canceled out, or balanced with the increase of primary reaction transmitted to the power carriage to cause a forward motion aided by the increased front spring pressure.

The front springs are compressed, causing no reduction in velocity of the power carriage's forward movement, until maximum equilibrium of constant velocity and pace keeping condition is reached between the forward moving housing, power carriage, and the maximum reduced thrust transmitting load carriage. Thus, a maximum reduced thrust rotating orbital and rack drive spur gears loss of thrust rotations is converted into a forward velocity.

When the maximum powered rotating worm screw gear of the power carriage has a spiraling linear velocity that is equal to that of the forward maximum velocity of the load carriage's worm drive gears, circumferential rotational velocity maximum velocity has been attained. Shutting off power of a counter-clockwise thrust rotation of the orbital and rack drive spur gears causes counter-clockwise rotation to stop instantly, and simultaneously to begin to move forward with a clockwise rotation with the load carriage, which is induced and activated into forward motion to a neutral midway position within the power carriage during the spring decompressing releasing action.

This causes the forward moving orbital and rack drive spur gears to rotate in a clockwise direction due to their gear meshing contact with the underside of the load linear gear power racks, causing clockwise rotation accompanied with the reduction of counter-clockwise thrust rotation for any forward motion. In addition to the above mentioned action, the generation of the primary and primary induced and activated secondary reactions are mechanically synchronized to start and stop automatically and simultaneously. Any forward linear movement from minimum to maximum acceleration in velocity transmitted to the load carriage causes from minimum to maximum loss of counter-clockwise thrust rotations transmitted by the orbital and rack drive spur gears, which are mechanically transmitted automatically to the differentials through the first planetary gear drive system and through the bevel lock thrust drive gear system.

An advantage of this invention is that it can be used to provide thrust for many types of vehicles.

Another advantage of this invention is that it provides thrust in more efficient manner than mechanical propulsion systems in the prior art since it does not utilize reciprocating or unbalanced members.

These and other objects and advantages of the present invention will no doubt become apparent upon a reading of the following descriptions and a study of the several figures of the drawing.

BRIEF DESCRIPTION OF THE DRAWING

FIG. 1 is an cross sectional, elevational view of the present invention;

FIG. 2 is an enlarged, cross sectional view of the portion of FIG. 1 encircled by line 2—2; and FIG. 3 is cross-sectional top plan view taken along line 3—3 of FIG. 1;

DETAILED DESCRIPTION OF THE PREFERRED EMBODIMENT(S)

Referring to FIGS. 1-3, a mechanical propulsion system 10 in accordance with the present invention includes a housing 12, a plurality of housing racks 14 coupled to the end thrust plates of the housing, a load carriage 16 supported by housing racks 14, and a power carriage 18 supported by load carriage 16. Propulsion system 10 is divided into four equal quadrants, one of which is encircled by broken line 2. Only the components within the quadrant 2 will be numbered, but it should be understood that the corresponding components in the remaining three quadrants are identical in construction and function, although, as will be explained subsequently, the lower transverse drive gears assembly rotates in the opposite direction than the upper transverse drive gear assembly.

Referring now with special reference to FIGS. 1 and 2, the propulsion system further includes a drive shaft 20, a screw gea 22 keyed to rotate with drive shaft 20 by barrel bearings 24, and a transversely rotating worm gear 26. A differential 28 includes a differential housing 30, and a differential gear assembly 32 including a pair of horizontal miter gears 34 and 36, and a pair of vertical miter gears 38 and 40. Horizontal miter gears 34 and 36 are removably attached to differential housing 30 by fasteners 42 and 44.

A transverse shaft 46 is rotatably supported by load carriage 16 with bearings 48. Vertical miter gear 38 is affixed to transverse shaft 46 for rotation therewith, as indicated by the broken crossed line 50.

A first orbital gear assembly 52 includes an orbital gear housing 54 and a first planetary gear assembly 56 disposed within the orbital gear. The orbital gear housing has a transverse extension 58 which is attached to and rotates with vertical miter gear 40. Transverse extension 58 is separated from transverse shaft 46 by a bearing 60.

The first planetary gear assembly includes a number of outer planetary gears 62 engaging the inner diametric surface of the first orbital gear 52, and a central or sun gear 64 engaged with planetary gears 62. As indicated by the broken crossed line at 66, central or sun spur gear 64 is attached to transverse shaft 46.

A bevel lock thrust drive gear assembly 200 includes an orbital gear attached plate and gear hub 201, vertical bevel gear 202, a number of horizontal bevel gears 205, horizontal bevel gear housing 206, a number of horizontal bevel gear shafts 207, a vertical bevel gear 204, rack drive spur gear 210, linear gear power rack 97, and planetary gear housing plate 56 attached to gear hub extension 211 which rotates around shaft 46 separated by bearing 213.

The function of the differentials 28 and the first planetary gear drive system 52 and the bevel lock thrust drive gear system 200 is to provide counterclockwise rotation and thrust under various changes of reduced thrust rotation transmitted by the orbital and rack drive spur gear 52 and 210. Any increase in counterclockwise thrust rotations transmitted to the differential gear housing 30 is accompanied by a corresponding decrease of counterclockwise thrust rotations transmitted by the orbital and rack drive spur gear 52 and 210. The loss of counterclockwise thrust rotations is represented as a constant or minimum to maximum acceleration in linear velocity and distance the load carriage 16 has traveled in relation to the forward moving housing 12 and power carriage 18. This is not the same velocity and distance as the outside of vehicle's velocity and distance of forward or reverse travel, but is actually a significant increase transmitted and imparted to the vehicle through housing 12 and power carriage 18 by the forward moving and thrust transmitting load carriage 16.

The mechanism is not required to keep pace with earth's ground surface with the forward moving vehicle. This performance is accomplished through a differential 28, a first position planetary gear drive system 52, and a bevel lock thrust drive gear system 200, of which the former assembly consists of an integral worm drive gear 26 and differential gear housing 30, two vertical differential miter gears 38 and 40 in gear meshed contact with two horizontal differential miter gears 34 and 36 which are attached on and fixed to rotate with differential gear housing 30.

The second assembly consists of an integral vertical differential miter gear 40, extension 58 and outside and inside gear meshed orbital drive spur gear 52, four planetary spur gears 62 with each opposite pair cancelling or balancing power and reaction effects, central sun spur gear 64 fixed to shaft 46 for rotation, planetary gear housing plate 56, and gear hub extension 211 which is free to rotate around shaft 46 separated by bearings 213. The latter assembly consists of an orbital drive spur gear 52 attached to bevel gear plate and gear hub 201, vertical bevel gear 202 in gear meshed contact with four horizontal bevel gears 205 with each opposite pair cancelling or balancing power and reaction effects, the bevel gears 205 being in gear meshed contact with planetary gear housing plate 56 and gear hub extension 211 mounted vertical bevel gear 204, four horizontal bevel gear shafts 207 mounted to the inside diameter of the horizontal bevel gear housing 206, and a rack drive spur gear 210 in gear meshed contact with linear gear power rack 97 of power carriage 18.

The requirement of the differential 28 is to apply equal load and resistance to each vertical differential miter gear 38 and 40 for full equal thrust and to prevent rotation of the horizontal differential miter gears 34 and 36 except for a change in direction of a dynamic force affecting the equal load and resistance. The vertical differential miter gear 40 is directly in gear meshed contact with the load and housing 12 and power carriage 18 through linear gear power racks 14 and 96 and by means of extension 58, which is an integral part of the orbital drive spur gear 52, of which the outside gear diameter is in gear meshed contact with linear gear power racks 14 and 96 of the load. Vertical differential miter gear 38 is fixed to shaft 46 for rotation and is indirectly contacted with the load through shaft 46, central sun gear 64 fixed to shaft 46 for rotation therewith and which is in gear meshed contact with four planetary spur gears 62, which are, in turn, in gear meshed contact with the inside gear diameter of the orbital drive spur gear 52, and through the planetary gear housing plate and gear hub extensions 56 and 211 mounted vertical bevel gear 204 is in gear meshed contact with horizontal bevel gears 205 and vertical bevel gear 202.

With the start of differential gear housing 30 counterclockwise rotation, vertical differential miter gear 40 remains stationary because of direct load resistance, causing counterclockwise rotating differential gear housing 30 and horizontal differential miter gears 34 and 36 start to rotate counterclockwise around stationary vertical differential miter gear 40, causing horizontal differential miter gears 34 and 36 to transmit counterclockwise rotation to vertical differential miter gear 38, which is fixed to shaft 46 for rotation. This causes central sun gear 64 fixed to shaft 46 to rotate counterclockwise, which is in gear meshed contact with planetary spur gears 62 to cause a change in direction of rotation to clockwise, which is transmitted to planetary gears 62 which are in gear meshed contact with the inside gear diameter of the loaded non-rotating orbital drive spur gear 52 upon which the planetary spur gears 62 (due to the clockwise rotation) react against the gear meshed teeth of the inside gear diameter of the loaded non-rotating orbital drive spur gear 52, causing a transmission of a counterclockwise rotation to the planetary gear housing plate 56, and gear hub extension 211 through the planetary gear shafts mounted upon the planetary gear housing plate 56 causing gear hub extension 211 mounted vertical bevel gear 204 to rotate in a counterclockwise direction which is in gear meshed contact with horizontal bevel gears 205, causing a change in direction of rotation to clockwise which is transmitted to horizontal bevel gears 205 which are in gear meshed contact with loaded non-rotating orbital drive spur gear 52 which is attached to the vertical bevel gear plate and gear hub 201, with the gear hub mounted to vertical bevel gear 202 upon which the horizontal bevel gears 205, due to clockwise rotation against the gear teeth mesh of the vertical bevel gear 202, transmit a clockwise rotation gear pressure against the loaded non-rotating orbital drive spur gear 52, which reacts back to horizontal bevel gears 205, transmitting to horizontal bevel gear shafts 207 a counterclockwise linear directed pressure against the horizontal bevel gears housing 206 and rack drive spur gear 210, which is in gear meshed contact with the loaded linear gear power rack 97 of the power carriage 18, causing the one sided counterclockwise rotation of take-up-play or tolerance between all inside gears to cease and lock together to a stop.

During the above function, the complimentary upper right quadrant differential gear housing's horizontal differential miter gears will be rotating in clockwise direction against the complimentary upper right quadrant loaded non-rotating orbital drive spur gear causing the complimentary upper right quadrant vertical differential miter gear, which is affixed to the same shaft 46, to rotate in the counterclockwise direction that was discussed with reference to vertical differential miter gear 38, and continue to the same conclusion (being locked together to a stop).

Simultaneously, the lower left quadrant differential gear housing's horizontal differential miter gears will be rotating in a clockwise direction against the lower left quadrant loaded non-rotating orbital drive spur gear, causing the lower left quadrant vertical differential miter gear, which is fixed to a lower quadrant shaft similar to shaft 46, to rotate in a clockwise direction and continue to the same conclusion of being locked together to a stop. The complimentary lower right quadrant differential gear housing's horizontal differential miter gears rotate in a counterclockwise direction against the complimentary lower right quadrant loaded non-rotating orbital drive spur gear, causing the complimentary lower right quadrant vertical differential miter gear, which is fixed to lower shaft similar to shaft 46, to rotate clockwise and continue to the same conclusion of being locked together to a stop.

These actions bring all inside, gear meshed tolerance or slack gears take-up play, bringing the one sided upper left quadrant counterclockwise rotation of the horizontal differential miter gears 34 and 36 around the loaded non-rotating vertical differential miter gear 40 to a stop which causes counterclockwise rotating vertical differential miter gear 38 come to a stop and lock together with the loaded non-rotating vertical differential miter gear 40, shaft 46, central sun gear 64, planetary spur gears 62, planetary gear housing plate 56 and hub extension 211 mounted bevel gear 204, horizontal bevel gears 205, loaded non-rotating orbital drive spur gear 52 attached plate and gear hub 201 mounted vertical bevel gear 202, loaded non-rotating orbital drive spur gear 52 and loaded non-rotating rack spur drive gear 210 all locked together with no rotation to continue counterclockwise rotation against the loaded linear gear power racks 14, 96, and 97. The differential gear housing 30, the first position planetary gear drive system 52 and bevel lock thrust drive gear system 200 with load resistance non-rotating inside gears continues to rotate counterclockwise as whole assemblies mounted on the load carriage 16 to begin the initial process of building up momentum and spring pressure by the counterclockwise rotation of the orbital and rack drive spur gears 52 and 210 against the linear gear power racks 14, 96, and 97 of the housing and power carriage 12 and 18.

Load carriage 16 is caused to recoil or move rearwardly towards the rear end of the now stationary or motionless power carriage 18 with housing 12. This action starts the generation of the primary and the primary induced and activated secondary reactions, causing the primary reaction to induce and activate the power carriage 18 and housing 12 into a forward motion in which the primary induced and activated secondary reaction simultaneously causes the generation of a counter-acting force to cancel out or balance the load resistance transmitted to the rear end of the now motionless power carriage 18 through a second position planetary gear system 74 by compressing the front springs 114 and applying spring pressure to the front end of the power carriage 18 until an equilibrium condition is reached and surpassed.

The power carriage 18 and housing 12 move forward with the rear end of the power carriage 18 moving toward the rear end of the recoiling or rearward moving thrust transmitting load carriage 16, causing an increase in the recoiling or compressing spring pressure transmitted to the rear end of the load carriage 16, forcing load carriage to move forward in the same direction simultaneously with the now forward moving power carriage 18 and housing 12. The instant load carriage 16 starts to move forward at constant or from minimum to maximum velocity, a change takes place with a reduction in counterclockwise thrust rotation transmitted by the orbital and rack drive spur gears 52 and 210, which are in gear meshed contact with the underside of the load's linear gear power racks 14, 96, and 97. Due to clockwise rotation, when moving forward, this causes the reduction to be transmitted to the vertical differential miter gear 40 for mechanical transmission coinciding with any constant or changing rates of minimum to maximum acceleration in linear velocity and distance traveled by the forward moving thrust transmitting load carriage 16 in relation to the forward moving housing 12 and power carriage 18.

Horizontal differential miter gear 34 and 36 rotate counterclockwise with the faster counter clockwise rotating differential gear housing 30, from which action horizontal differential miter gears 34 and 36 are counterclockwise rotating against the slower counterclockwise rotating vertical differential miter gear 40. The counterclockwise rotation of the horizontal differential miter gears 34 and 36 are added to the rotations of the faster counterclockwise rotating differential gear housing 30 to transmit the increased counterclockwise rotations to vertical differential miter gear 38 fixed to shaft 46 for rotation, and transmitting the increased counterclockwise rotation to central sun gear 64 which is fixed to shaft 46 for rotation.

Planetary spur gear 62 rotates clockwise away from the inside gear diameter under contact pressure between increasing rotation against the slower counterclockwise thrust rotating orbital drive spur gear 52, causing planetary gear assembly plate 56 and gear hub extension 211 mounted vertical bevel gear 204 to rotate in a counterclockwise direction which is in gear meshed contact with four horizontal bevel gears 205, causing a change in the direction of rotation to clockwise which is transmitted to horizontal bevel gears 205, which are in gear meshed contact with the orbital drive spur gear 52 mounted plate and hub 201 and vertical bevel gear 202 causing vertical bevel gear 202 to rotate in a clockwise direction with the reduced or reducing counterclockwise thrust rotating orbital and rack drive spur gears 52 and 210. The clockwise rotating horizontal bevel gears 205 locks reduced counterclockwise thrust with clockwise reducing rotating vertical bevel gear 202 with counterclockwise rotating vertical bevel gear 204, causing rack drive spur gear 210 to transmit reduced counterclockwise thrust rotation along with orbital drive spur gear 52 due to the equal and opposite rotation of vertical bevel 202 and vertical bevel gear 204 with simultaneous counter clockwise thrust rotation transmitted by orbital and rack drive spur gears 52 and 210.

Reducing the power, acceleration, and velocity imparted to the forward moving housing and power carriage (which appears motionless to the forward moving pace keeping load carriage) causes the extra spring pressure generated in the previous higher acceleration and velocity to be imparted to the forward moving housing and power carriage to release the extra compression spring pressure by forcing the forward moving pace keeping load carriage to move forward in a new position. This matches the inertial load resistance from which action the counterclockwise rotation is further reduced until the forward moving pace keeping load carriage reaches constant velocity with the reduced accelerated forward moving housing and power carriage, and to resume a power related lower counterclockwise thrust rotation.

Turning off the power causes the counterclockwise thrust rotating orbital and rack drive spur gears to stop instantly and roll forward with a clockwise rotation due to its gear meshing contact under linear gear power racks 14, 96, and 97. The imparted momentum of the forward moving vehicle is transmitted by the chassis mounted housing with the load carriage moving forward to a neutral position midway within the length of the power carriage.

A pair of bracket portions 68 extend downwardly from an upper portion of load carriage 16. A flanged load wheel 70 is rotatably coupled to bracket portion 68 by an axle 72. Load wheel 70 rides along the smooth upper surface of housing rack 14.

A second orbital gear 74 is coupled to a power rack 76, which can also be described as a secondary reaction, double gear edged, linear power gear rack. A secondary reaction is generated by the primary reaction induced and activated by the load carriage moving towards the rear end of the motionless or forward moving power carriage, causing the orbital drive spur gear 74 of the second planetary gear system which is in gear meshed contact with double edged tooth linear gear rack 76 to rotate a limited circumferential distance with spur gear 94, which is in gear meshed contact with the shouldered forward moving linear gear power rack 92. This pushes, in a forward direction, a front spring plate 88' of the load carriage and compresses front spring 114 to apply pressure against the front end of power carriage to cancel out, neutralize, or balance the inertial load resistance against the power carriage.

A second planetary gear assembly 78 includes planetary gears 80 rotatably coupled to load carriage 16 by axle fasteners 82, and a transversely elongated spur gear 84 engaged with planetary gears 80. Elongated spur gear 84 is supported for coaxial rotation around transverse shaft 46 by bearings 86.

Spring plates 88' and 88" are coupled to load carriage 16 by center and concentric slide rods 90 and 91. A double shouldered spring plate linear gear rack 92 is engaged with spring plates 88' and 88". A spur gear 94 is attached to elongated spur gear 84 and engages spring plate linear gear rack 92.

A power rack 96 and 97 are attached to forward and rearward sections of power carriage 18 (which are essentially removable thrust plates). A flanged wheel 102 engages the upper, side edge surface of power carriage 18 and is rotatably coupled to load carriage 16 by an axle 104. Transverse shaft 46 is further supported by bearings 106.

Referring now more specifically to FIG. 3, the mechanical propulsion system 10 of the present invention further includes a flywheel plate 108 (which serves as a prime mover coupling) attached to the end of drive shaft 20, and a pair of main bearing assemblies 110 and 112 supporting the drive shaft 20. Four compression springs 114 are retained between the power carriage 18 and the spring plates 88' and 88". More specifically, two of the springs 114 are held between forward plate 18' of the power carriage and forward spring plate 88', and two springs 114 are held between rearward plate 18" of power carriage 18 and the rearward spring plate 88".

Plates 18', 18", 88', and 88", may be be provided with spring posts 116 to hold the springs in position.

In operation, a power source such as the output shaft of an internal combustion engine is attached to flywheel coupling plate 108 of the present invention. All rotations around an axis parallel to drive shaft 20 will be described from a point of view of line F—F, an all rotation around a transverse axis parallel to transverse shaft 46 will be taken from the point of view of L—L.

Screw gear 22 is cut with a right-hand thread and rotates counter clockwise as viewed from the front of the device along line F—F. The counter clockwise rotation of screw gear 22 causes the right hand thread leads to spiral to the right in a linear clockwise direction towards the transverse worm gear 26 as viewed from the front of the device along line F—F. This transmits counterclockwise rotation to worm gear 26 as seen or viewed from line L—L on the left side of housing 12.

The counterclockwise rotation of transverse worm gear 26 causes the housings 30 of the differential gears 28 to rotate counterclockwise. Through the action of the differential gears 34–40, transverse extension 58 causes orbital gear 52 to rotate in a counterclockwise direction. Since vertical miter gears 38 are rigidly affixed to transverse shaft 46, it too is rotating counterclockwise and consequently drives sun spur gear 64 which is in gear meshed contact with planetary spur gear 62 and which is rotating in a clockwise direction away from the inside gear diameter of the orbital drive spur gear 52. This causes planetary gear housing plate 56 and gear hub extension 211 mounted vertical bevel gear 204 to rotate counterclockwise, which is in gear meshed contact with horizontal bevel gears 205, changing the rotation to clockwise to coincide with the loss of counterclockwise thrust rotation of the orbital and rack drive spur gears 52 and 210 when the load carriage 16 is moving forward.

The counterclockwise rotation of first orbital and rack drive spur gears 54 and 210 at the start causes the entire load carriage 16 to move towards the rear of the housing 12 due to its engagement with the housing 12 and power carriage 18 power racks 14, 96, and 97. The forward rotating orbital and rack drive spur gears 52 and 210 begin movement with commencement of forward movement of the power carriage 18 and housing 12, due to its engagement with linear gear power racks 14, 96, and 97. The rearward movement of the load carriage 16 towards the rear end of motionless or forwardly moving power carriage 18 due to start or acceleration causes a compression of springs 114 between spring plate 88" of the load carriage and 18" of the power carriage Simultaneously, spur gear 94 is also rotating with a limited circumferential distance in a counterclockwise direction, causing the double shouldered spring rack 92 to move towards the front of the housing. Spur gear 94 has as many or the same number of teeth as spur gear 84 to cause the forward spring plate to travel the same distance as the rearward moving or recoiling load carriage under start or minimum to maximum acceleration of thrust.

In other words, since the load carriage is recoiling and the power carriage remains motionless or forward moving along with the housing, the forward spring plate must be moved forward the same distance to properly compress forward springs 114. The shoulder of gear rack 92 engages forward spring plate 88' and pushes it towards the front of the housing 12 at the same rate as the recoiling load carriage under start or minimum to maximum acceleration of thrust. Thus, forward springs 114 are compressed between forward spring plate 88' and forward power carriage portion 18'.

Viewing from L—L and F—F, at the start of a counterclockwise rotation of the screw gear 22, the top worm gear 26 is caused to rotate in a counterclockwise direction, while the bottom worm gear is caused to rotate in a clockwise direction to develop thrust against the housing racks 14 and the power carriage racks 96 and 97 in the forward direction. Due to load inertia, a resistance is generated to any forward movement of the housing and power carriage causing the four orbital gears 52 and the four rack drive spur gears 210 to build up momentum and pressure such that the load carriage is induced to move rearwardly. This compresses springs 114, by which action the recoiling load carriage moving towards the rear end of the motionless or forward moving power carriage under start or acceleration causes a primary reaction induced and activates secondary reaction force generated through the secondary planetary gear system 74 to compress the front springs 114. This generates pressure which is applied to the front end of the power carriage to cancel out or balance the inertial load resistance against the power carriage. When the load and power carriages have generated the required momentum and pressure, this potential force is converted into dynamic force, causing the load carriage to push and move the power carriage, housing and load forward.

As the housing, load, and power carriage are moving forward, the upper and lower complimentary orbital and rack drive spur gears 52 and 210 by the agency of the differential gears 28, the first planetary gear drive system 52, and the bevel lock thrust drive gear system 200 and the forward moving load carriage (with the orbital and rack drive spur gears 52 and 210 transmitting counterclockwise thrust rotations) begin to decrease in counterclockwise thrust rotations, which are transferred through the upper and lower differential gears, the upper and lower first planetary gear drive system 52, and the upper and lower bevel lock thrust drive gear system 200 to mechanically transmit the difference between differential gear housing 30 counterclockwise thrust rotation to coincide with the reduced counterclockwise thrust rotating orbital and rack drive spur gears, maintaining the proper thrust during from minimum to maximum forward velocity of the load carriage. A decrease in the thrust rotations of the orbital and rack drive spur gears 52 and 210 below the differential gear housing 30 rotations causes an increasing loss of counterclockwise thrust rotation from minimum to maximum power, and moves it with less counterclockwise rotation thrust at the same lower powered acceleration in velocity transmitted to the load carriage, power carriage and housing. The bottom half of the mechanism operates as a mirror image to the top half of the mechanism. For reverse thrust, the drive shaft is rotated in the opposite direction.

In brief summary, rotation of drive shaft 20 through the intermediaries of a number of gears causes load carriage 16 and spring plate 88" to move to the rear end of the motionless or forward moving power carriage under start or acceleration, where the front spring plate 88' moves towards the forward part of the motionless or forward moving power carriage and the housing. The rearward springs 114 are compressed between rearwardly moving spring plate 88" and the portion 18' of the motionless or forward moving power carriage under start or acceleration and the forward springs 114 are compressed between the portion 18' of the motionless or forward moving power carriage under start or acceleration, where there is the same recoiling movement and distance of the load carriage's forward moving portion 88' as that of the spring plate. Thus, when power is applied to this device all of the springs go into compression.

The amount of compression that springs 114 go though is dependent upon the amount of power taken from the propulsion system. If, for example, no power is taken from the propulsion system 10 then the springs 114 would not be compressed. If a maximum amount of power was taken from propulsion system then all of the springs 114 would go into maximum compression. The tensions of the springs are therefore chosen to be sufficient under maximum load conditions.

When the springs are compressed to a point where the power taken from the propulsion system 10 is equal to the power to required to move the load, the four first orbital drive spur gears 52 and the rack drive spur gears 210 begin to lose counterclockwise thrust rotations when the loaded housing, power carriage, and load carriage begin to move forward. This housing 12 force can be transferred to a vehicle to move it forward along a thrust axis "T" parallel to drive shaft 20. Of course, a reverse thrust can be produced by reversing the direction of rotation of the main drive shaft 20.

Lubrication of the mechanism can be accomplished by oil bath, splash or force feed spray. While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A mechanical propulsion sytem comprising:
   (a) a support structure having a thrust axis;
   (b) rack means attached to said support structure parallel to said thrust axis;
   (c) a load carriage coupled to said rack means for forward or reverse movement with recoil action parallel to said thrust axis;
   (d) a power carriage coupled to said load carriage for independent forward or reverse movement parallel to said thrust axis;
   (e) transverse drive means having an axis of rotation substantially perpendicular to said thrust axis and engaging said rack means, said load carriage, and said power carriage;
   (f) means for storing potential energy developed by the relative motion of said load carriage and said power carriage; and
   (g) means for powering said transverse drive means such that energy that is not stored by said means for storing potential energy is converted into a thrust force on said rack means.

* * * * *